United States Patent Office 2,896,982
Patented July 28, 1959

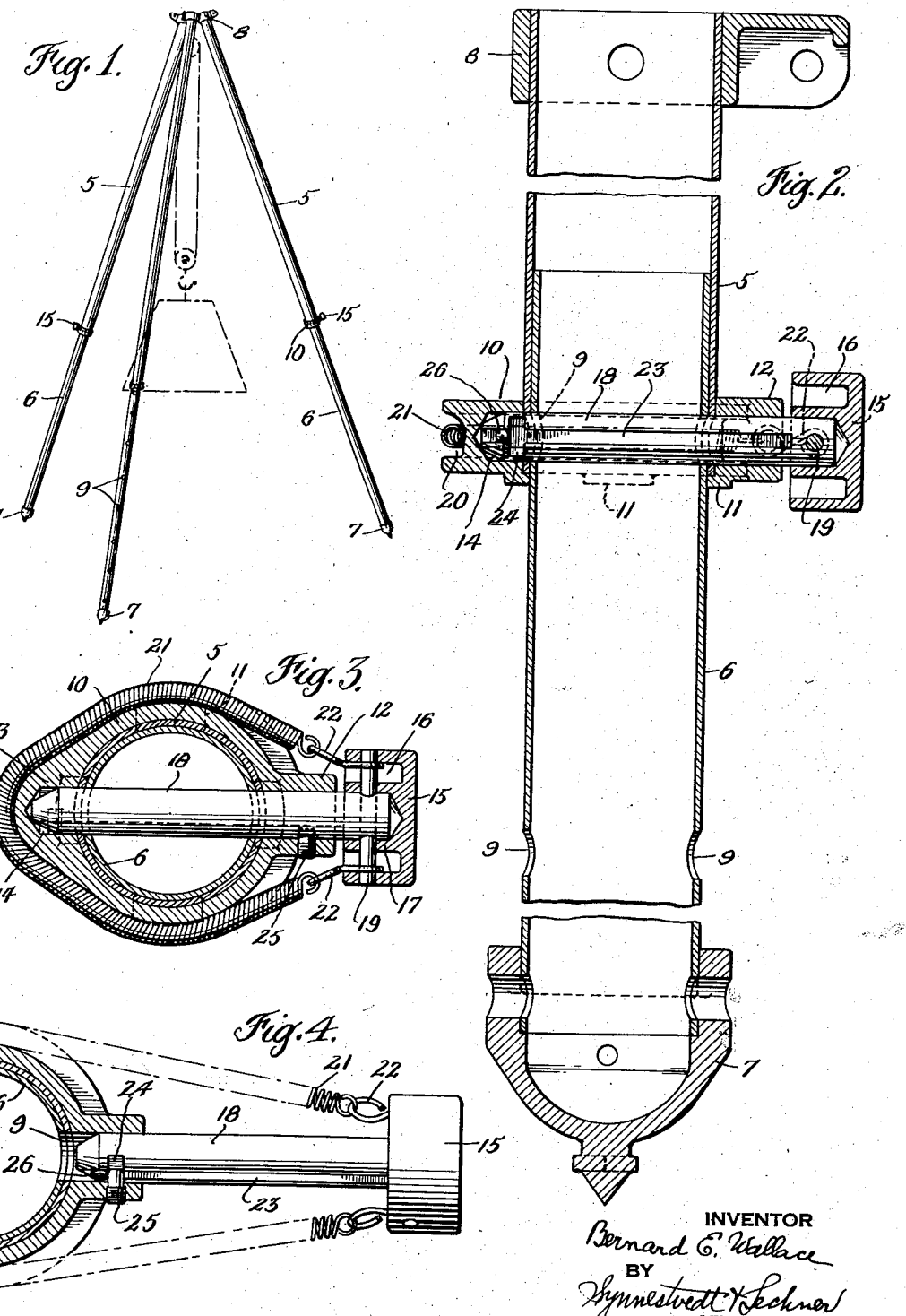

2,896,982

ADJUSTABLE LEG OR THE LIKE

Bernard E. Wallace, Exton, Pa.

Application June 6, 1957, Serial No. 663,957

8 Claims. (Cl. 287—58)

This invention relates to an adjustable leg or device of a like nature which consists essentially of a pair of elongated telescoping members, the structure, of course, being lengthened when the two members are moved away from each other and shortened when they are moved toward each other.

In the accompanying drawing I have illustrated my invention as embodied in a tripod construction, but I wish it to be undertsood that the principles involved may be used in other constructions such as A-frame supports, gantries and the like. I also wish it to be understood that the invention is not to be limited to legs per se but is applicable to other devices where telescoping members may be useful.

The principal objects of the invention involve the provision of a construction of the character described in which the two telescoping members have a self-locking feature which holds them in their desired adjusted position; the provision of a construction in which the locking member cannot be removed or accidentally lost; to provide a construction which enables the user to use both hands in making necessary adjustments in length without the necessity for applying one hand to the locking means, said means automatically functioning when the proper relative position of the parts has been effected; to provide a construction in which the locking member can be held in its unlocked position by a simple motion of one member of the leg with respect to the other; to provide a very sturdy construction capable of supporting very heavy loads; and to reduce the cost of equipment of this type.

How the foregoing objects together with such other objects as may appear hereinafter or are incident to my invention are attained is illustrated in preferred form in the accompanying drawing wherein:

Fig. 1 is a perspective view of a tripod suitable for supporting a weight the legs of which tripod embody my improvements;

Fig. 2 is a much enlarged longitudinal section through one of the tripod legs;

Fig. 3 is a transverse section on the same scale as Fig. 2 taken at the point where the two telescoping members are locked together; and Fig. 4 is a partial view similar to Fig. 3 but illustrating the locking bolt in its outermost position.

It will be seen from the drawings that my improved leg includes a pair of telescoping members 5 and 6, the member 5 being the outer member and the member 6 the inner member. These members are of tubular construction, but it is obvious that other configurations might be employed. At its lower end the inner member 6 is provided with a suitable pointed foot member 7 and the outer member 5 is provided at its upper end with a connecting fixture 8 of whatever form may be necessary for the particular device in question. The inner member is also provided with a series of pairs of opposed bolt holes 9 which are adapted to cooperate with the locking means now to be described. At the end where the inner member 6 enters the outer member 5, the latter is preferably provided with an external collar 10 having an interior opening which fits snugly around the outside of the member 5. A series of four lugs 11 are arranged to abut against the lower end of the member 5 so as to properly position the collar on the member.

This collar is a convenient means for providing a pair of opposed external enlargements 12 and 13. The enlargement 12 is somewhat more lug-like than the enlargement 13, but the purpose of both enlargements is essentially the same, namely, to provide bolt aligning or receiving portions as will further appear. It will be understood, of course, that these enlargements might be applied as individual members, but I prefer to embody them in the collar 10 as illustrated because the collar itself forms a strengthening member surrounding the tube 5 and makes it possible to use a tube section of less dimension. However, it is not always essential to use the enlargement 13.

After the collar 10 is applied a bolt hole is drilled through the enlargement or lug 12, the adjacent wall of the outer member 5, the opposite or opposed wall of the member 5, and finally into the enlargement 13. It is not necessary to drill the hole all the way through the enlargement 13 so that the hole at this side becomes in effect a bolt recess 14. This covers the end of the bolt, but as indicated above, it will not be necessary in all instances to so cover the bolt because it could project freely through the hole in the outer member 5.

The bolt is preferably provided with an enlarged head 15 having an annular recess 16 surrounding a central hub 17. The adjacent end of the bolt 18 fits into an opening in the hub and the bolt and the head are drilled to receive a coupling pin 19 which holds the parts together in the manner most clearly illustrated in Fig. 3.

Surrounding the coupling and fitting into a groove or channel 20 is a coil spring 21 the ends of which are fastened to the head of the bolt, one at each side by means of suitable hook portions 22. The spring is arranged to bias the bolt inwardly or into its closed or locking position as shown in Figs. 2 and 3.

One side of the bolt is provided with a longitudinal slot 23 and a transverse slot 24 which crosses the longitudinal slot near the inner end of the bolt. Extending through a suitable aperture in the enlargement or lug 12 is a pin 25 which may be screwed into place or otherwise suitably inserted. The parts are assembled so that the pin 25 will project into the slots 23 and 24, a stop member 26 being introduced at the inner end of the longitudinal slot 23 so that the bolt cannot be unintentionally removed or lost.

It is believed that the operation of the device is obvious from the description and the drawing but it might be pointed out that when it is desired to adjust the length of the leg the bolt is pulled outwardly sufficiently far to clear the outer surface of the inner member 6 whereupon the inner member can be slid with respect to the outer member, the inner end of the pin sliding upon the surface of the member 6 until it comes into alignment with a pair of holes 9 whereupon the spring 21 instantly and automatically snaps the bolt into position to self-lock the leg in its adjusted position. There are times when it is not convenient for the operator not to have the bolt automatically snap into its locking position and in such instances, after it is pulled outwardly sufficiently far, it is simply rotated or turned slightly so that the pin 25 engages one side or the other of the transverse or cross slot 24 in which position it will hold the bolt in its unlocked position against the tension of the spring 21 as shown in Fig. 4. After the operator makes the desired adjustment with both hands free, it is a simple matter to turn the bolt slightly and thereby permit it to snap into its locking position.

I claim:

1. An adjustable leg or the like comprising a pair of telescoping members, the outer of which is provided at one end with a collar, opposed transverse bolt holes in the collar and the adjacent wall of the said outer member, a bolt adapted to slide in said holes, a longitudinal slot on the side of the bolt, a transverse slot near the inner end of the bolt crossing said longitudinal slot, a pin carried by the collar and arranged to project inwardly from the collar into said slots, a series of pairs of opposed bolt holes in the inner member adapted to be aligned with the holes in the outer member upon relative movement between the members, and spring means biasing the bolt inwardly, the bolt being adapted to be held in its outmost position upon rotation thereof to bring said transverse slot into register with said pin.

2. A structure according to claim 1 wherein the bolt has an enlarger head and wherein the spring means is a coil spring passing around the external member with its ends secured to the head at opposed points.

3. An adjustable leg or the like comprising a pair of telescoping members the outer of which is provided at one end with opposed external enlargements, a transverse bolt hole through one enlargement and the adjacent wall of said outer member, an opposed bolt hole in the wall at the other side of said outer member, a bolt receiving recess in the other enlargement in alignment with said opposed bolt holt, a bolt adapted to slide in said holes and recess, a longitudinal slot on the side of the bolt, a pin carried by said first enlargement and arranged to project inwardly into said slot, a series of pairs of opposed bolt holes in the inner member adapted to be aligned with the holes in the outer member upon relative movement between the members, and spring means biasing the bolt inwardly.

4. A structure according to claim 3 wherein a transverse slot is provided in the bolt near the inner end thereof crossing said longitudinal slot, said pin being adapted to project into said transverse slot to hold the bolt in its outmost position upon rotation of the bolt.

5. A structure according to claim 4 wherein the bolt has an enlarged head and wherein the spring means is a coil spring passing around the external member with its ends secured to the head at opposed points.

6. A structure according to claim 3 wherein the bolt has an enlarged head and wherein the spring means is a coil spring passing around the external member with its ends secured to the head at opposed points.

7. An adjustable leg or the like comprising a pair of telescoping members the outer of which is provided at one end with a bolt supporting external lug, a transverse bolt hole through said lug and said outer member, a bolt hole through said outer member directly opposite said lug hole, a bolt adapted to slide in said holes, a longitudinal slot on the side of the bolt, a pin carried by said lug and arranged to project inwardly into said slot, a series of pairs of opposed bolt holes in the inner member adapted to be aligned with the holes in the outer member upon relative movement between the members, and spring means biasing the bolt inwardly.

8. A structure according to claim 7 wherein the bolt has an enlarged head and wherein the spring means is a coil spring passing around the external member with its ends secured to the head at opposed points.

References Cited in the file of this patent

UNITED STATES PATENTS

| | | |
|---|---|---|
| 226,113 | Rominger | Mar. 30, 1880 |
| 552,921 | Miner | Jan. 14, 1896 |
| 2,484,401 | Coie | Oct. 11, 1949 |
| 2,558,768 | McCormick | July 3, 1951 |